US012363432B2

(12) United States Patent
Wang et al.

(10) Patent No.: US 12,363,432 B2
(45) Date of Patent: Jul. 15, 2025

(54) DATA COLLECTION DEVICE, DATA COLLECTION SYSTEM, AND ELECTRONIC IMAGE STABILIZATION DEVICE

(71) Applicant: Shenzhen MicroBT Electronics Technology Co., Ltd., Guangdong (CN)

(72) Inventors: Zhongping Wang, Guangdong (CN); Guo Ai, Guangdong (CN); Ju He, Guangdong (CN); Zuoxing Yang, Guangdong (CN); Ruming Fang, Guangdong (CN); Zhihong Xiang, Guangdong (CN)

(73) Assignee: Shenzhen MicroBT Electronics Technology Co., Ltd., Guangdong (CN)

( * ) Notice: Subject to any disclaimer, the term of this patent is extended or adjusted under 35 U.S.C. 154(b) by 0 days.

(21) Appl. No.: 18/721,273

(22) PCT Filed: Nov. 29, 2022

(86) PCT No.: PCT/CN2022/135062
§ 371 (c)(1),
(2) Date: Oct. 31, 2024

(87) PCT Pub. No.: WO2023/130859
PCT Pub. Date: Jul. 13, 2023

(65) Prior Publication Data
US 2025/0159347 A1  May 15, 2025

(30) Foreign Application Priority Data

Jan. 7, 2022  (CN) .......................... 202210014428.6

(51) Int. Cl.
*H04N 23/68* (2023.01)

(52) U.S. Cl.
CPC .............................. *H04N 23/6812* (2023.01)

(58) Field of Classification Search
CPC .................................................. H04N 23/6812
See application file for complete search history.

(56) References Cited

U.S. PATENT DOCUMENTS 10,444,761 B2   10/2019  Liu et al.
2013/0335554 A1  12/2013  Brunner et al.
(Continued)

FOREIGN PATENT DOCUMENTS

CN   109084746 A   12/2018
CN   110823246 A    2/2020
(Continued)

OTHER PUBLICATIONS

Zhao Sai., "The Video Stabilization Algorith Based on MEMS Gyroscope", Information Technology Series, Northwest University, Jan. 15, 2019.
(Continued)

*Primary Examiner* — Cynthia Segura
(74) *Attorney, Agent, or Firm* — Harness, Dickey & Pierce, P.L.C.

(57) ABSTRACT

Disclosed include a data collection device, a data collection system, and an electronic image stabilization device. The data collection device includes a logic circuit. The logic circuit includes: a timer, configured to generate timestamp data; a control module, configured to, in response to receiving a pre-set input signal, generate a data obtaining command and obtain the timestamp data from the timer; a communication module, configured to, in response to the data obtaining command, obtain MEMS (MEMS) data from a MEMS sensor; and a packing module, configured to pack the MEMS data and the timestamp data into a data packet.

8 Claims, 4 Drawing Sheets

(56) References Cited

U.S. PATENT DOCUMENTS

2016/0356634 A1* 12/2016 Czompo .............. G01D 21/00
2021/0306821 A1*  9/2021 Breton ................. H04Q 9/04
2021/0392269 A1   12/2021 Hosseinimakarem et al.

FOREIGN PATENT DOCUMENTS

| CN | 111309094 A | 6/2020 |
| CN | 114024991 A | 2/2022 |
| JP | 2016192137 A | 11/2016 |

OTHER PUBLICATIONS

First Chinese Office Action issued on Feb. 16, 2022 by the Chinese Patent Office in corresponding CN Patent Application No. 202210014428.6.
Second Chinese Office Action issued on Mar. 10, 2022 by the Chinese Patent Office in corresponding CN Patent Application No. 202210014428.6.
Chinese Notice of Allowance issued on Apr. 1, 2022 by the Chinese Patent Office in corresponding CN Patent Application No. 202210014428.6.
International Search Report of the International Searching Authority, issued in PCT/CN2022/135062, mailed Feb. 23, 2023; ISA/CN.

* cited by examiner

DATA COLLECTION DEVICE, DATA COLLECTION SYSTEM, AND ELECTRONIC IMAGE STABILIZATION DEVICE

CROSS-REFERENCE TO RELATED APPLICATIONS

This application is a 371 U.S. National Phase of International Application No. PCT/CN2022/135062, filed on Nov. 29, 2022, which claims priority to Chinese Patent Application No. 202210014428.6, filed Jan. 7, 2022. The entire disclosures of the above applications are incorporated herein by reference.

TECHNICAL FIELD

The present disclosure relates to data collection, and particularly, to a data collection device, a data collection system, and an electronic image stabilization device.

BACKGROUND ART

Micro-electro-mechanical system (MEMS) is a microelectronics-based multidisciplinary research frontier. MEMS sensor is a novel type of sensor manufactured using microelectronics and micro-machining techniques. Compared with traditional sensors, MEMS sensors feature in their small sizes, light weight, low cost, low power consumption, high reliability, suitable for mass production, easy to be integrated, support for intelligentization, and etc. At present, in MEMS sensor-based data collection application scenarios, MEMS data is typically collected directly from MEMS sensors. MEMS data is measurement data obtained directly by the MEMS sensors, such as rotation angles, temperatures, acceleration and the like.

SUMMARY

Various embodiments of the present disclosure provide a data collection device, a data collection system, and an electronic image stabilization device.

The data collection device of various embodiments includes a logic circuit which includes:
a timer, configured to generate timestamp data;
a control module, configured to, in response to receiving a pre-set input signal, generate a data obtaining command and obtain the timestamp data from the timer;
a communication module, configured to, in response to the data obtaining command, obtain MEMS data from a MEMS sensor; and
a packing module, configured to pack the MEMS data and the timestamp data into a data packet.

An electronic image stabilization device includes:
a data collection device, including a logic circuit, wherein the logic circuit includes: a timer, configured to generate timestamp data; a control module, configured to, in response to receiving a pre-set input signal, generate a data obtaining command and obtain the timestamp data from the timer; a communication module, configured to, in response to the data obtaining command, obtain MEMS data from a MEMS sensor; and a packing module, configured to pack the MEMS data and the timestamp data into a data packet; and
a digital image stabilization module, configured to perform digital image stabilization processing on a digital image using the data packet provided by the data collection device.

A data collection system includes:
an MEMS sensor, configured to acquire MEMS data; and
the data collection device of various embodiments.

It can be seen from the above-mentioned technical schemes that in various embodiments of the present disclosure, a timer is configured to generate timestamp data; a control module is configured to generate a data obtaining command and obtain the timestamp data from the timer in response to receiving a pre-set input signal; a communication module is configured to obtain MEMS data from a MEMS sensor in response to the data obtaining command; and a packing module is configured to pack the MEMS data and the timestamp data into a data packet. It can be seen that according to various embodiments of the present disclosure, MEMS data and timestamp data are obtained respectively, and the MEMS data and the timestamp data are packed together into a data packet to facilitate subsequent use of the MEMS data in time dimension using the data packet, thereby makes the data more convenient to use.

DETAILED DESCRIPTION

Figure 1:
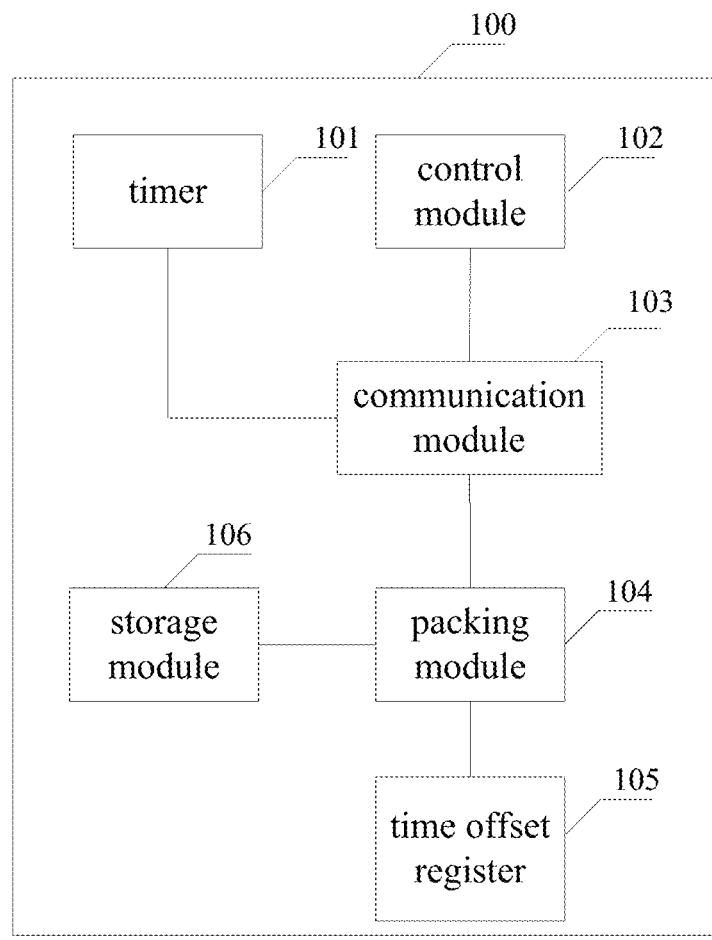
FIG. 1 is a schematic diagram of the structure of a data collection device according to an example of the present disclosure.

In order to make the objectives, technical schemes and merits of the present disclosure more apparent, the present disclosure is described in further detail below with reference to the accompanying drawings.

For simplicity and clarity of description, the schemes of the present disclosure are described below through a number of representative embodiments. Abundant details are provided in the embodiments merely for facilitating understanding of the schemes of the present disclosure. Apparently, the technical schemes of the present disclosure can be implemented without being limited to those details. To avoid unnecessarily obscuring the schemes of the present disclosure, some embodiments are not described in detail, but only outlined. In the description, "including" refers to "including but not limited to", and "according to" refers to "at least according to, not merely according to". Because of characteristics of the Chinese language, when the number of a component is not specified below, it means that there may be one or a plurality of the components, or there is at least one component.

In view of disadvantages of conventional MEMS sensor-based data collection scenarios that the conventionally acquired MEMS data generally lacks the acquisition time, various embodiments of the present disclosure obtain MEMS data and timestamp data respectively and pack the MEMS data and the timestamp data together into the same data packet to facilitate subsequent consumption of the MEMS data in time dimension using the data packet (e.g., in electronic image stabilization processing).

In various embodiments of the present disclosure, data collection devices, data collection systems, and electronic image stabilization devices are implemented using hardware logic.

In some embodiments, the data collection device may be a stand-alone device having a communication connection with an electronic device that consumes sensor data, e.g., an electronic image stabilization device.

In some embodiments, the data collection device may be implemented by an electronic device that consumes sensor data. For example, the data collection device may be implemented by a newly added component in the electronic device, or by an existing component in the electronic device.

In some embodiments, the data collection device may be implemented by a re-designed logic circuit of an on-chip intellectual property (IP) module with newly added functions. The re-design may be done at the IC design stage or implemented by FPGA logic. For example, the adopted may be a dedicated hardware control module, being a set of hardware-driven logic circuit, which receives an interrupt from a sensor (e.g., a gyroscope) or a trigger from a timer, proactively controls an inter-integrated circuit (IIC) bus or a serial peripheral interface (SPI) to collect data, obtains time information of the timer, packs and stores the data and the time information into a memory.

A detailed description is set forth below with reference to the accompanying drawings and some embodiments.

FIG. 1 is a schematic diagram of the structure of a data collection device according to an embodiment of the present disclosure.

As shown in FIG. 1, the data collection device 100 includes a logic circuit. The logic circuit includes:
- a timer 101, configured to generate timestamp data;
- a control module 102, configured to, in response to receiving a pre-set input signal, generate a data obtaining command and obtain the timestamp data from the timer 101;
- a communication module 103, configured to, in response to the data obtaining command, obtain MEMS data from a MEMS sensor (not shown in FIG. 1); and
- a packing module 104, configured to pack the MEMS data obtained by the communication module 103 and the timestamp data obtained by the control module 102 into a data packet.

In various embodiments of the present disclosure, compared with conventional software-based collection scheme, the hardware logic-based collection process not only can improve the accuracy, but also can reduce the burden of the CPU which frequently triggers and responds to interrupts and controls peripheral device to collect data, and improve the stability of the overall system. The CPU refers to a CPU in a system-on-chip (SOC), or a microcontroller unit (MCU) in an integrated circuit.

In various embodiments, an MEMS sensor detects measured information, and converts the detected information according to a certain rule into an output electrical signal or information in another required form, i.e., collecting the measured MEMS data.

In various embodiments, MEMS sensors may include: (1) MEMS gas flow sensors; (2) MEMS pressure sensors; (3) MEMS non-contact temperature sensors; (4) MEMS switches; (5) MEMS motion sensors (e.g., gyroscope, rotational speed sensors, tilt sensors, speed sensors, acceleration sensors, etc.), and the like.

The above are typical examples of MEMS sensors, and those skilled in the art can understand that they are merely examples and are not intended to limit the scope of embodiments of the present disclosure.

The timer 101 may generate timestamp data using various predetermined timing logics. For example, the timer 101 may be implemented as a time-stamping timing circuit having a crystal resonator.

In response to receiving a pre-set input signal, the control module 102 performs the following processing.

Processing (1): Generate a data obtaining command.

Processing (2): Obtain timestamp data (typically a timestamp specifying a current system time) from the timer 101.

In some embodiments, the control module 102 may perform processing (1) and processing (2) simultaneously.

In some other embodiments, the control module 102 performs processing (1) before processing (2). In some embodiments, the timestamp data may be corrected in an advancing manner (that is, a predetermined offset is subtracted from the obtained timestamp data).

In still some other embodiments, the control module 102 performs processing (2) before processing (1). In some embodiments, the timestamp data may be corrected in delaying manner (that is, a predetermined offset is added to the obtained timestamp data).

The control module 102 may be implemented as a multi-functional control unit such as an application processor (AP) or as a microcontroller unit (MCU) which serves as a co-processor. The multi-functional control unit may be a multi-functional control unit in an electronic device that consumes sensor data. As such, the control module 102 has been implemented in a conventional multi-functional control unit, does not require additional hardware structures, thus can reduce hardware costs.

In some embodiments, according to some other embodiments of the present disclosure, the control module 102 may be implemented as a dedicated hardware control module. The dedicated hardware control module has a hardware structure independent from a multi-functional control unit such as an MCU or an AP. As such, the control module 102, when implemented as a dedicated hardware control module, does not do tasks other than data collection, thus it can be avoided that other tasks affect the timeliness of the task for accessing the MEMS sensors, the timeliness of the MEMS sensor accessing tasks can be improved, and the time deviation between the MEMS data and the current system time can be eliminated or reduced.

In an exemplary embodiment, the control module 102 includes a dedicated hardware control module independent from a multi-functional control unit. The dedicated hardware control module is connected to the MEMS sensor via an interrupt signal wire. The input signal is an interrupt signal generated when the MEMS sensor acquires the MEMS data and transmitted to the dedicated hardware control module via the interrupt signal wire. In this embodiment, when the MEMS sensor acquires the MEMS data, the MEMS sensor transmits an interrupt signal to the dedicated hardware control module via the interrupt signal wire. In response to receiving the interrupt signal, the dedicated hardware control module starts the task of accessing the MEMS sensor to generate a data obtaining command and to obtain timestamp data from the timer 101. The communication module 103 executes the data obtaining command to obtain the MEMS data from the MEMS sensor. The packing module 104 packs the MEMS data obtained by the communication module 103 and the timestamp data obtained by the dedicated hardware control module into a data packet.

In an exemplary embodiment, the control module 102 includes a dedicated hardware control module independent of the multi-functional control unit. The dedicated hardware control module is connected to the timer 101 via a clock signal wire. The input signal is a timing signal which is generated by the timer 101 in response to detection of an arrival of a pre-set time and is transmitted to the dedicated hardware control module via the clock signal wire. In this embodiment, when the timer 101 detects the arrival of the pre-set time, the timer 101 transmits a timing signal to the dedicated hardware control module via the clock signal wire. In response to receiving the timing signal, the dedicated hardware control module starts the task of accessing the MEMS sensor to generate a data obtaining command and obtains timestamp data from the timer 101. The communication module 103 executes the data obtaining command to obtain the MEMS data from the MEMS sensor. The packing module 104 packs the MEMS data obtained by the communication module 103 and the timestamp data obtained by the dedicated hardware control module into a data packet.

In an embodiment, the communication module 103 may be implemented as a serial communication module or a parallel communication module. For example, the communication module 103 may be implemented as an inter-integrated circuit (IIC) communication module or a serial peripheral interface (SPI) communication module, or the like.

It is considered that the process of the communication module 103 obtaining the MEMS data from the MEMS sensor generally takes more time and the process of the control module 102 reading the timestamp data generally takes less time, various embodiments of the present disclosure may perform corrections to address the time difference in time taken by the two processes, thereby further improve the accuracy of the timestamp data.

In an exemplary embodiment, the data collection device 100 may also include a time offset register 105. The time offset register 105 is configured to store a pre-set time offset. The packing module 104 is configured to read the time offset from the time offset register 105, correct the timestamp data using the time offset, and pack the MEMS data and the corrected timestamp data into the data packet. In some embodiments, the time offset in the time offset register 105 is adjustable.

In various embodiments, the time offset stored in the time offset register 105 is typically an empirical value with respect to the MEMS sensor. For example, the time offset may vary according to different MEMS sensor models. The time offset may be a positive value, a negative value, or zero.

The packing module 104 is configured to pack the MEMS data obtained by the communication module 103 and the timestamp data obtained by the control module 102 into a data packet. In the data packet, the MEMS data and the timestamp data are stored in a manner that they are associated with each other. The timestamp data typically specifies the time at which the MEMS data is obtained. The packing module 104 may be implemented as a dedicated hardware structure, or as an integrated part of the control module 102, or as a software module executed by the multi-functional control unit such as an MCU or an AP. Various embodiments of the present disclosure are not limited thereto.

In an exemplary embodiment, the data collection device 100 further includes: a storage module 107. The storage module 107 is configured to store the data packets in a queue. For example, the storage module 107 stores the data packets in a first-in first-out (FIFO) queue.

Figure 2:
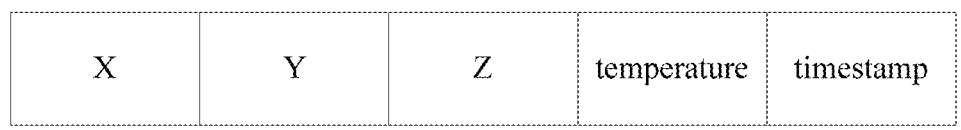
FIG. 2 is a schematic diagram of a data packet according to an example of the present disclosure.

FIG. 2 is a schematic diagram of a data packet according to an example of the present disclosure.

In FIG. 2, the data packet includes a time value specified by a timestamp and MEMS data provided by the MEMS sensor. The MEMS data includes three-dimensional coordinates (X, Y, Z) and a temperature value.

While FIG. 2 depicts the details and the structure of an exemplary data packet, it will be appreciated by those skilled in the art that such descriptions are merely exemplary and are not intended to limit the implementation of the data packet.

A routine data collection process implemented by the hardware logic according to the present disclosure is described below.

The control module may trigger and turn on the communication module, e.g., a SPI or IIC Master module, periodically or on demand, to collect position information.

When an MEMS-specific register or an MEMS sensor has an external interrupt signal wire having an interrupt initiating function, after the control module receives an electric level or an interrupt pulse signal from the MEMS, the SPI or IIC is started to read the coordinates of the MEMS-specific register or MEMS sensor.

When the MEMS-specific register or MEMS sensor has not the interrupt initiating function, after a timer of a chip reaches a timing value, the coordinates of the MEMS-specific register or MEMS sensor is read.

The obtained MEMS coordinate data may be temporarily stored in a static random-access memory (SRAM) of the control module. A time value register in the timer is read via an advanced peripheral bus (APB), and the time value read-out is converted into milliseconds. A time offset register is read, an offset value is added to or subtracted from the time value, and the time value is temporarily stored in the SRAM of the control module. This step may be performed simultaneously with the aforementioned operations. The SRAM is not limited to be within the control module.

One data collection is completed after all of data in the SRAM is written into a pre-defined FIFO memory address in a pre-defined format.

The MEMS data and the timestamp data are read from the FIFO memory address in subsequent packing process at the packing module.

The time interval of queries about whether there is new data in the MEMS may be configured, and the value of the time offset register may also be configured according to situations such as different MEMS modules and different IIC reading speeds. The FIFO address written to may be a circular buffer, and the hardware switches to a next new buffer address each time after reading out new data.

Various embodiments of the present disclosure also provide a data collection system.

Figure 3:
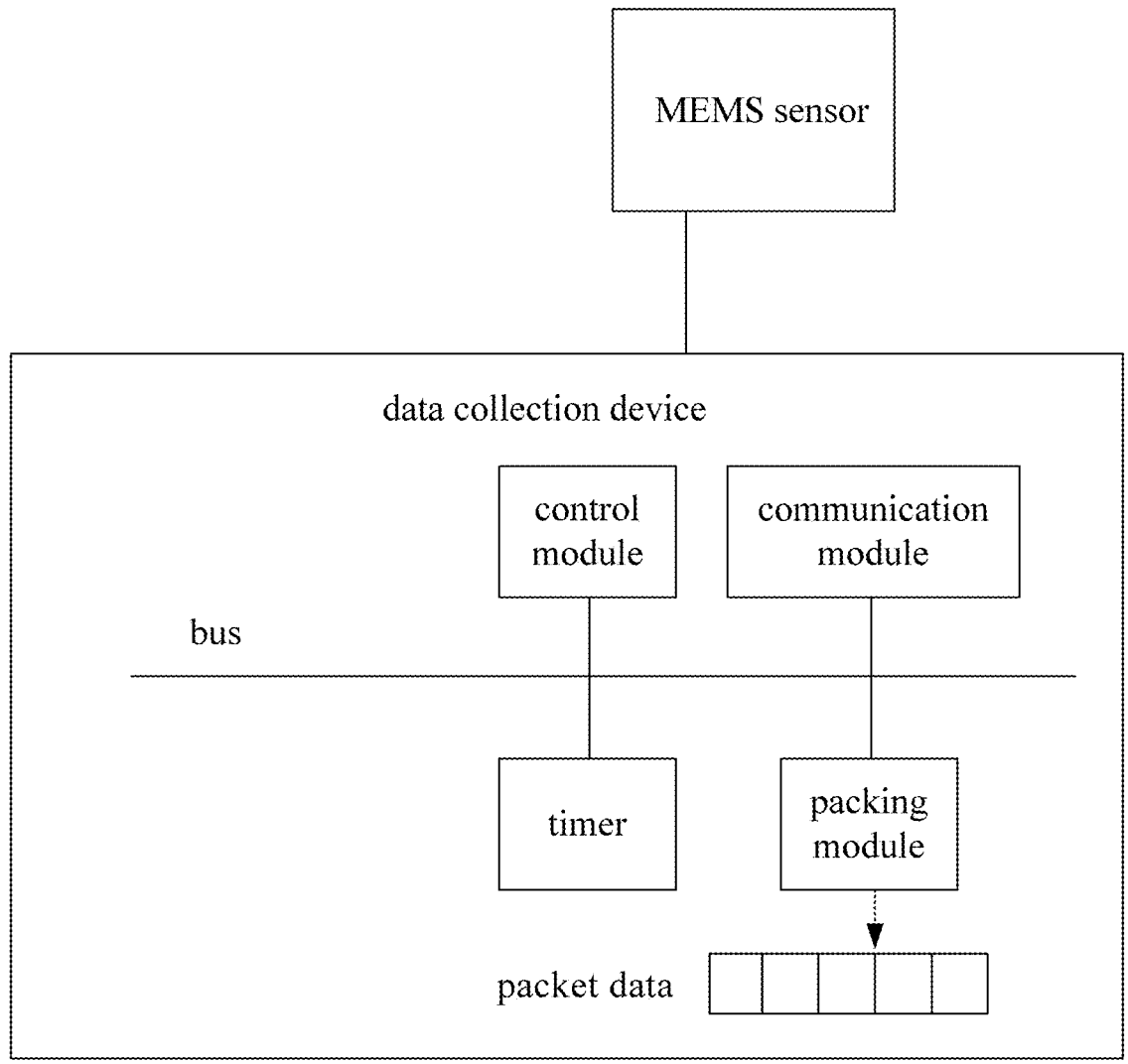
FIG. 3 is a schematic diagram of the structure of a data collection system according to an example of the present disclosure.

FIG. 3 is a schematic diagram of the structure of a data collection system according to an embodiment of the present disclosure.

The data collection system includes: a MEMS sensor configured to collect MEMS data and a data collection device. The data collection device includes: a timer, configured to generate timestamp data; a control module, configured to generate a data obtaining command and obtain timestamp data from the timer in response to receiving a pre-set input signal; a communication module, configured to obtain MEMS data from a MEMS sensor in response to the data obtaining command; and a packing module, configured to pack the MEMS data and the timestamp data into a data packet. The modules in the data collection device may communicate with each other through a built-in bus.

The data collection device in FIG. 3 may be the data collection device 100 as shown in FIG. 1. In addition, the MEMS sensor in FIG. 3 may specifically include: an MEMS accelerometer, an MEMS microphone, a micro-motor, a micro-pump, a micro-oscillator, an MEMS optical sensor, an MEMS pressure sensor, an MEMS gyroscope, an MEMS humidity sensor, an MEMS gas sensor, an MEMS flow sensor, or the like.

The embodiments of the present disclosure may be applied to a variety of applications. For example, the applications may include: (1) medical fields such as non-invasive fetal heart test: (2) fields of automobile electronics such as measuring air bag pressure, fuel oil pressure, engine oil pressure, intake pipe pressure, tire pressure, or the like; (3) fields of motion tracking systems; (4) fields of mobile phone photographing; (5) fields of industrial control, and the like.

In some embodiments, the embodiments of the present disclosure may be applied to an image stabilization system of a mobile phone photographing or motion tracking system. Exemplary applications of the embodiments of the present disclosure in the image stabilization system is described below.

In the image stabilization system, the timeliness of MEMS data plays a vital role in the anti-shake and image stabilization performances. Gyroscopes commonly used in image stabilization systems, such as MPU6050, ICM-20690, and corresponding product series, have a data output rate (ODR) of about 200-800 Hz. Generally, such gyroscopes can only output motion-related data (such as rotation angles, temperatures, accelerations, and etc.) while lacking description of the time at which the motion-related data is obtained, thus may tend to contribute to the time non-synchronization in anti-shake and image stabilization.

Through the embodiments of the present disclosure, the AP or the MCU may access the gyroscope via an IIC or SPI interface in a polling manner or an interrupt signal trigger manner to obtain gyroscope data (typically including gyroscope position information). Then the AP or the MCU reads a current system time from a timing module (such as a hardware timer), and packs the gyroscope data and the system time.

In conventional electronic image stabilization devices, sensor data is collected according to scheduling by software in the AP or the MCU, and the system time and the sensor data usually have a time difference, and the time difference is not fixed.

Various embodiments of the present disclosure provide an electronic image stabilization device that addresses the time difference issue.

Figure 4:
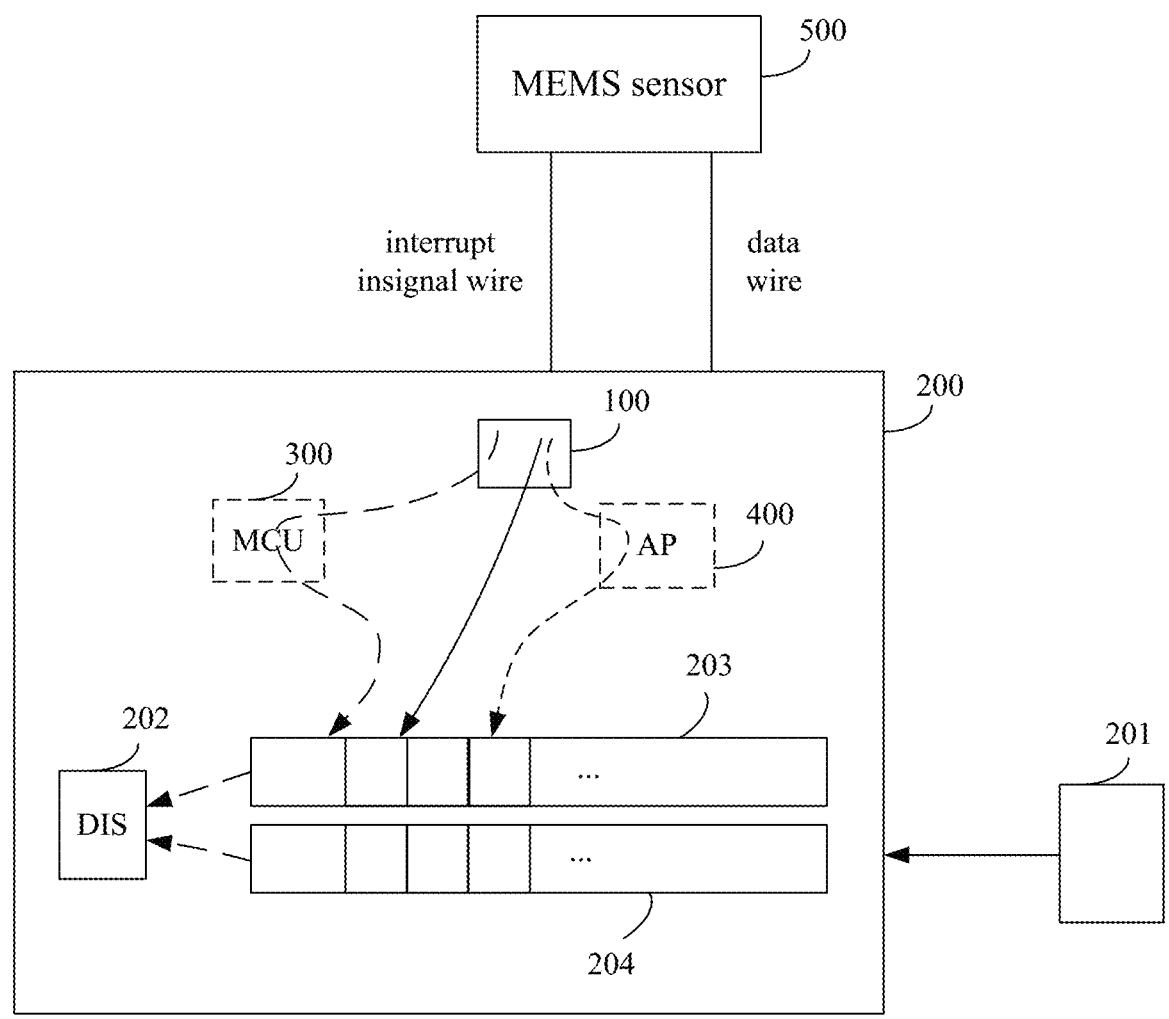
FIG. 4 is a schematic diagram of the structure of an electronic image stabilization device according to a first example of the present disclosure.

FIG. 4 is a schematic diagram of the structure of an electronic image stabilization device according to a first example of the present disclosure.

As shown in FIG. 4, the electronic image stabilization device 200 includes a data collection device 100 and a digital image stabilization (DIS) module 202.

The data collection device 100 has a structure as shown in FIG. 1. The data collection device 100 includes a logic circuit. The logic circuit includes: a timer, configured to generate timestamp data; a control module, configured to generate a data obtaining command and obtain the timestamp data from the timer in response to receiving a pre-set input signal; a communication module, configured to obtain MEMS data from a MEMS sensor 500 in response to the data obtaining command; and a packing module, configured to pack the MEMS data and the timestamp data into a data packet.

It can be seen that the electronic image stabilization device may no longer include an MCU or an AP conventionally used for acquiring sensor data since MEMS data is collected using a data collection device 100 implemented by a hardware logic circuit. When the MCU or the AP is not required by other functions of the data collection device 100, the MCU or the AP may be no longer included, thus the cost of the device can be reduced. In addition, since the MCU or the AP is no longer included and the MEMS data is collected using the hardware logic circuit, the time deviation between the MEMS data and the current system time is also eliminated or reduced, thus the anti-shake performances of the electronic image stabilization device can be improved.

In some embodiments, the control module includes a dedicated hardware control module independent of a multi-functional control unit. The dedicated hardware control module is connected to the MEMS sensor 500 via an interrupt signal wire. The input signal is an interrupt signal generated when the MEMS sensor acquires the MEMS data and transmitted to the dedicated hardware control module via the interrupt signal wire.

When the MEMS data is obtained, the MEMS sensor 500 transmits an interrupt signal to the dedicated hardware control module in the data collection device 100 via the interrupt signal wire. Upon receiving the interrupt signal, the dedicated hardware control module begins the task of accessing the MEMS sensor 500 to generate a data obtaining command. Upon receiving the interrupt signal, the dedicated hardware control module also obtains timestamp data from the timer. The communication module executes the data obtaining command to obtain MEMS data from the MEMS sensor 500 through a data wire. The packing module packs the MEMS data obtained by the communication module and the timestamp data obtained by the dedicated hardware control module into a data packet, and stores the data packet in a first queue 203 of the electronic image stabilization device 200 in a first-in first-out storage manner.

A digital image obtaining module 201 obtains a digital image and a digital image capturing time, and stores an image data packet including the digital image and the digital image capturing time in a second queue 204 of the electronic image stabilization device 200 in a first-in first-out storage manner.

A DIS module 202 performs DIS processing on the second queue 204 using the first queue 203. Specifically, the DIS module 202 performs a time synchronization operation using the timestamp data in the first queue 203 and the digital image capturing time in the second queue 204, and performs an anti-shake processing on digital images in the second queue 204 using the MEMS data in the first queue 203.

Existing sensors, such as gyroscopes, may include a built-in FIFO, and each frame of image in the image stabilization system requires real-time sensor data for calibration. Therefore, the built-in FIFO of the sensor cannot buffer much data to avoid increasing the buffering delay of video. However, in various embodiments of the present disclosure, a first queue and a second queue are arranged in an electronic image stabilization device for caching MEMS data packets and image data packets respectively. Digital images in the second queue are processed for anti-shake using MEMS data in the first queue without relying on data cached in the built-in FIFO of the sensor, and the first queue can store more data than the built-in FIFO of the sensor without increasing the video buffering delay.

Figure 5:
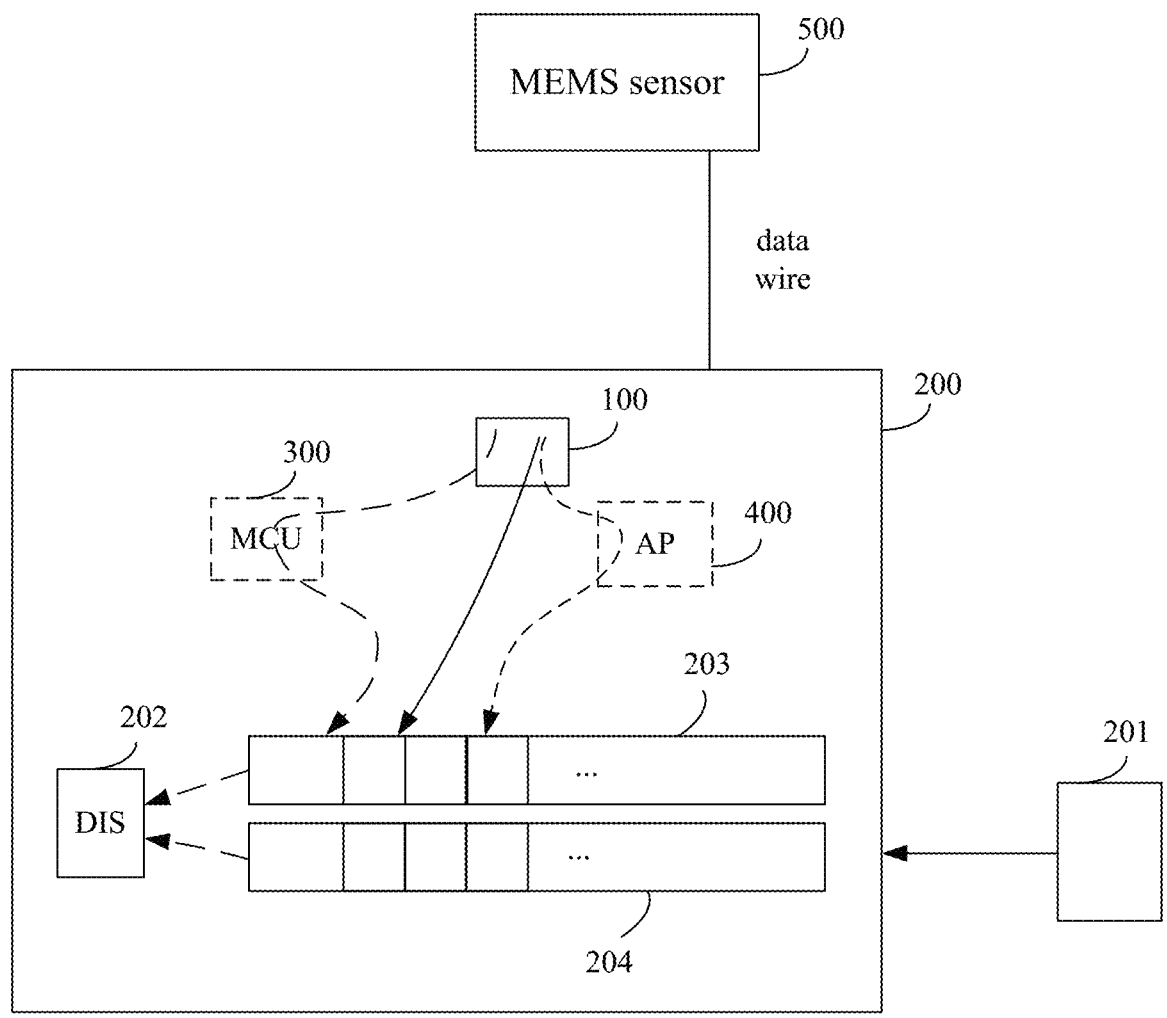
FIG. 5 is a schematic diagram of the structure of an electronic image stabilization device according to a second example of the present disclosure.

FIG. 5 is a schematic diagram of the structure of an electronic image stabilization device according to a second example of the present disclosure.

As shown in FIG. 5, the electronic image stabilization device 200 includes a data collection device 100 and a DIS module 202.

The data collection device 100 has a structure as shown in FIG. 1. The data collection device 100 includes a logic circuit. The logic circuit includes: a timer, configured to generate timestamp data; a control module, configured to generate a data obtaining command and obtain the timestamp data from the timer in response to receiving a pre-set input signal; a communication module, configured to obtain MEMS data from a MEMS sensor 500 in response to the data obtaining command; and a packing module, configured to pack the MEMS data and the timestamp data into a data packet.

It can be seen that the electronic image stabilization device acquires MEMS data using the data collection device 100 implemented by a hardware logic circuit, thus may no longer include an MCU or an AP conventionally used for collecting sensor data, the cost of the MCU or the AP is eliminated. In addition, since the MCU or the AP is no longer included and the MEMS data is acquired using the hardware logic circuit, the time deviation between the MEMS data and the current system time is also eliminated or reduced, and the anti-shake effect of the electronic image stabilization device is improved.

In some embodiments, the control module includes a dedicated hardware control module independent of a multi-functional control unit. The dedicated hardware control module is connected to the timer via a clock signal wire. The input signal is a timing signal generated when the timer detects the arrival of a pre-set time and transmitted to the dedicated hardware control module via the clock signal wire.

When the timer detects the arrival of the pre-set time (for example, a predetermined periodic cycle), the timer 101 transmits a timing signal to the dedicated hardware control module via the clock signal wire. Upon receiving the timing signal, the dedicated hardware control module begins the task of accessing the MEMS sensor to generate a data obtaining command and to obtain timestamp data from the timer. The dedicated hardware control module may obtain the timestamp data from the timer via the clock signal wire, or obtain the timestamp data from the timer 101 via an additional signal wire. The communication module executes the data obtaining command to obtain the MEMS data from the MEMS sensor 500. The packing module packs the MEMS data obtained by the communication module and the timestamp data obtained by the dedicated hardware control module into a data packet, and stores the data packet in a first queue 203 of the electronic image stabilization device 200 in a first-in first-out storage manner.

A digital image obtaining module 201 obtains a digital image and a digital image capturing time, and stores an image data packet including the digital image and the digital image capturing time into a second queue 204 of the electronic image stabilization device 200 in a first-in first-out storage manner.

A DIS module 202 performs DIS processing on the second queue 204 using the first queue 203. Specifically, the DIS module 202 performs a time synchronization operation using the timestamp data in the first queue 203 and the digital image capturing time in the second queue 204, and performs an anti-shake processing on digital images in the second queue 204 using the MEMS data in the first queue 203.

In some embodiments of the present disclosure, a first queue and a second queue are arranged in an electronic image stabilization device for caching MEMS data packets and image data packets respectively, and digital images in the second queue are stabilized using MEMS data in the first queue without relying on data cached in a built-in FIFO of a sensor. At the same time, timeliness of data acquired by the first queue is better compared with the built-in FIFO of the sensor while the video buffering delay is not increased.

It should be noted that not all the procedures and modules in the above-mentioned flowcharts and schematic diagrams are necessary, and some steps or modules may be omitted according to actual requirements. The order of execution of the procedures is not fixed and may be adjusted as required. Various modules are functional modules for facilitating description. In practice, one module may be divided into a plurality of modules, functions of a plurality of modules may also be realized by one module, and these modules may be located in the same device or in different devices.

Hardware modules in various embodiments may be implemented mechanically or electronically. For example, one hardware module may include a specially designed permanent circuit or logic device (for example, a dedicated processor such as an FPGA or ASIC) for performing a particular operation. The hardware module may also include a programmable logic device or circuit (for example, including a general purpose processor or other programmable processors) temporarily configured by software for performing a particular operation. Whether to implement the hardware module mechanically or using a dedicated permanent circuit or using a temporarily configured circuit (e.g., by software) may be determined using cost and time considerations.

In the above description, "schematic" means "serving as an instance, example, or illustration", and any illustration or embodiment described as "schematic" should not be construed as a preferred or advantageous technical solution. For the sake of clarity of the drawings, only components related to the present disclosure are schematically shown in the drawings, and the drawings do not represent an actual structure of the product. In addition, for the sake of clarity of the drawings and ease of understanding, only one of components that have the same structure or function may be schematically shown or marked in some of the drawings. As used herein, "a" and "an" are not for limiting the number of related components of the present disclosure to "only one", and do not exclude possibility that the number of related components of the present disclosure is "more than one". As used herein, "upper", "lower", "front", "back", "left", "right", "inner", "outer", and the like are used merely to indicate relative positional relationships between related components, and do not limit the absolute positions of these components.

The technical features of the above embodiments may be combined in any combination, and in order to make the description concise, not all the possible combinations of the technical features in the above-mentioned embodiments are described. However, as long as there is no contradiction between the combinations of these technical features, the combinations should be considered as the scope of the description.

In summary, the scope of the claims should not be limited to the embodiments of the examples described above, but the description should be taken as a whole and the broadest interpretation should be given.

The invention claimed is:

1. A data collection device, comprising a logic circuitry, the logic circuitry comprising:
   a timer, configured to generate timestamp data;
   a control module, being a dedicated logic circuit independent of a multi-functional control unit, configured to, in response to receiving an interrupt signal of a Micro-Electro-Mechanical system (MEMS) sensor or a trigger signal of the timer, generate a data obtaining command and obtain the timestamp data from the timer for specifying a time at which the MEMS data is obtained;
   a communication module, configured to, in response to the data obtaining command, obtain MEMS data from the MEMS sensor;
   a time offset register, configured to store a pre-set time offset which is an empirical value with respect to the MEMS sensor; and
   a packing module, configured to read the time offset from the time offset register, correct the timestamp data using the time offset, and pack the MEMS data and the corrected timestamp data into a data packet in which the MEMS data is associated with the corrected timestamp data which specifies the time at which the MEMS data is obtained.

2. The data collection device according to claim 1, wherein the control module is connected to the MEMS sensor via an interrupt signal wire; and
   the input signal is an interrupt signal which is generated when the MEMS sensor acquires the MEMS data and is transmitted to the control module via the interrupt signal wire.

3. The data collection device according to claim 1, wherein the control module is connected to the timer via a clock signal wire; and
   the input signal is a timing signal which is generated when the timer detects the arrival of a pre-set time and is transmitted to the control module via the clock signal wire.

4. The data collection device according to claim 1, further comprising:
   a storage module, configured to store the data packet in a queue.

5. An electronic image stabilization device, comprising:
   a data collection device, comprising a logic circuitry, the logic circuitry comprising: a timer, configured to generate timestamp data; a control module, being a dedicated logic circuit independent of a multi-functional control unit, configured to, in response to receiving an interrupt signal of a Micro-Electro-Mechanical system (MEMS) sensor or a trigger signal of the timer, generate a data obtaining command and obtain the timestamp data from the timer for specifying a time at which the MEMS data is obtained; a communication module, configured to, in response to the data obtaining command, obtain MEMS data from the MEMS sensor; a time offset register, configured to store a pre-set time offset which is an empirical value with respect to the MEMS sensor; and a packing module, configured to read the time offset from the time offset register, correct the timestamp data using the time offset, and pack the MEMS data and the timestamp data into a data packet in which the MEMS data is associated with the corrected timestamp data which specifies the time at which the MEMS data is obtained;
   a digital image stabilization module, configured to perform digital image stabilization processing on a digital image using the data packet provided by the data collection device.

6. The electronic image stabilization device according to claim 5, wherein
   the control module is connected to the MEMS sensor via an interrupt signal wire; and the input signal is an interrupt signal which is generated when the MEMS sensor acquires the MEMS data and is transmitted to the control module via the interrupt signal wire.

7. The electronic image stabilization device according to claim 5, wherein
   the control module is connected to the timer via a clock signal wire; and the input signal is a timing signal which is generated when the timer detects the arrival of a pre-set time and is transmitted to the control module via the clock signal wire.

8. A data collection system, comprising:
   a Micro-Electro-Mechanical system (MEMS) sensor, configured to acquire MEMS data; and
   a data collection device comprising a logic circuitry, the logic circuitry comprising: a timer, configured to generate timestamp data; a control module, being a dedicated logic circuit independent of a multi-functional control unit, configured to, in response to receiving an interrupt signal of the MEMS sensor or a trigger signal of the timer, generate a data obtaining command and obtain the timestamp data from the timer for specifying a time at which the MEMS data is obtained; a communication module, configured to, in response to the data obtaining command, obtain the MEMS data from the MEMS sensor; a time offset register, configured to store a pre-set time offset which is an empirical value with respect to the MEMS sensor; and a packing module, configured to read the time offset from the time offset register, correct the timestamp data using the time offset, and pack the MEMS data and the timestamp data into a data packet in which the MEMS data is associated with the corrected timestamp data which specifies the time at which the MEMS data is obtained.

* * * * *